Aug. 21, 1962 W. G. KUBICEK 3,050,050
ALTERNATING PRESSURE SEAT
Filed July 13, 1956 3 Sheets-Sheet 1
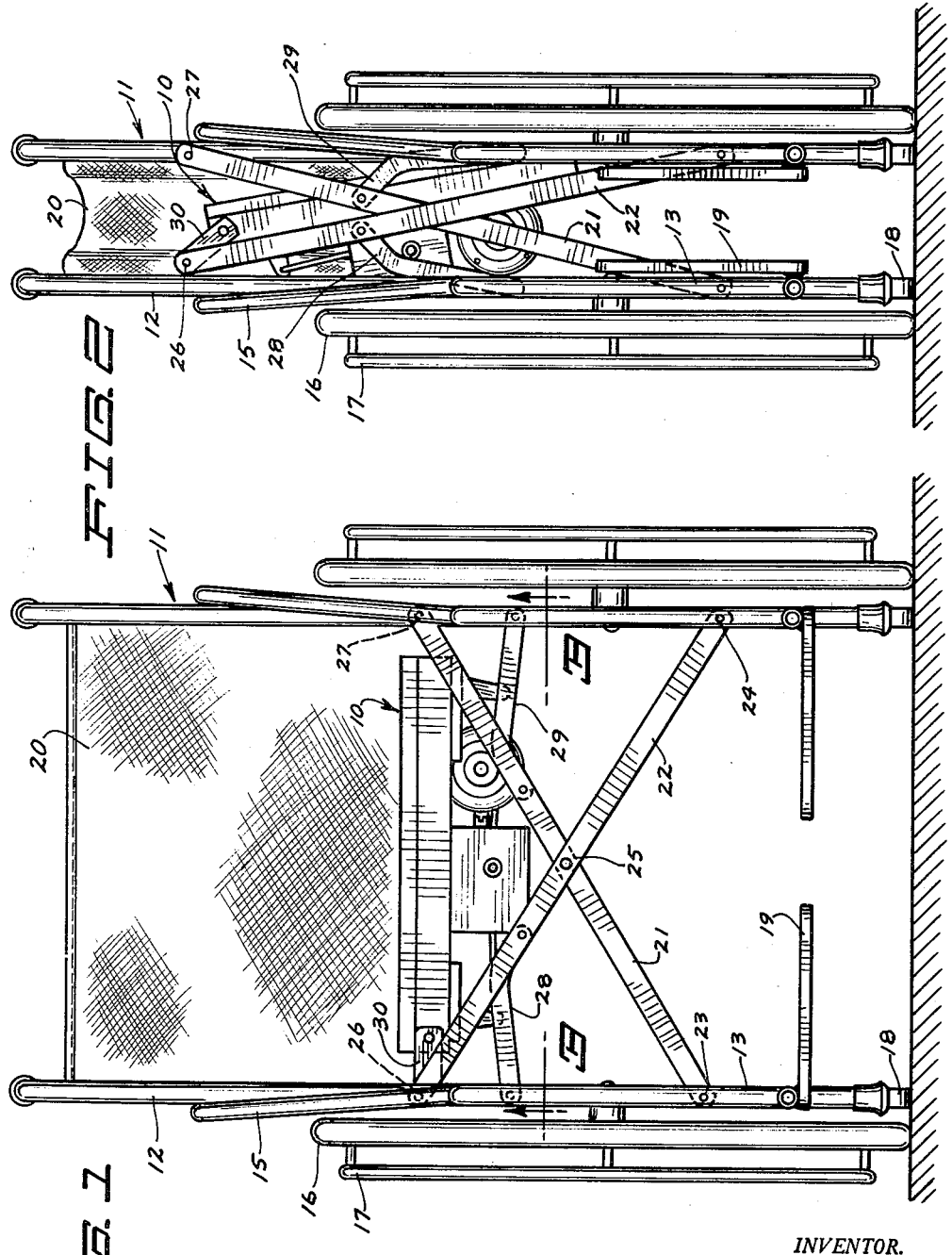
INVENTOR.
WILLIAM G. KUBICEK
BY
Moore, Dugger, White & Burd
ATTORNEYS

INVENTOR.
WILLIAM G. KUBICEK

Aug. 21, 1962 W. G. KUBICEK 3,050,050
ALTERNATING PRESSURE SEAT
Filed July 13, 1956 3 Sheets-Sheet 3
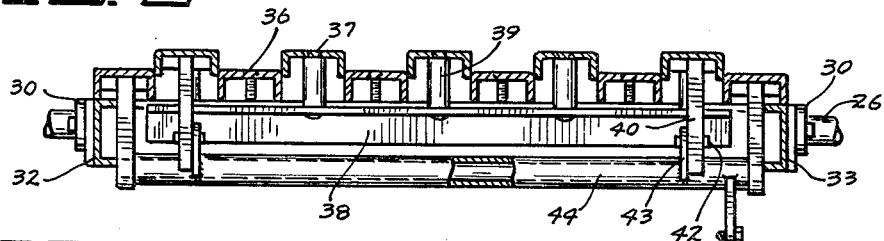
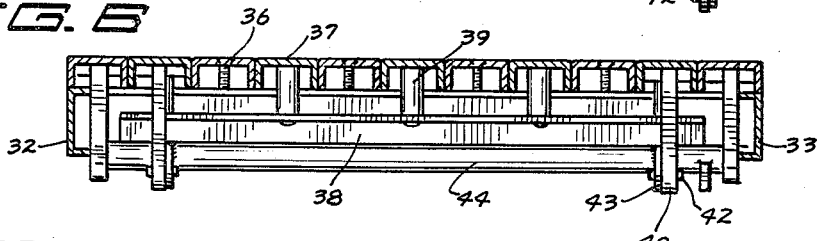
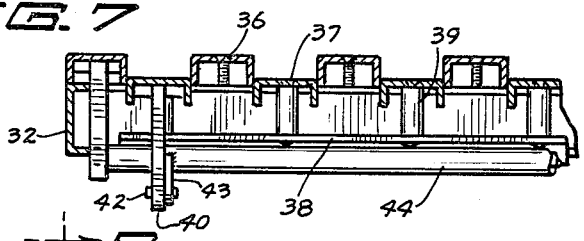
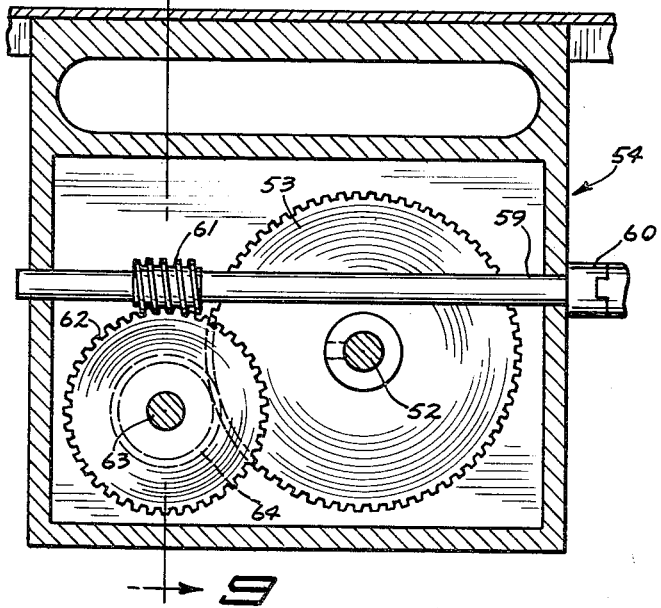
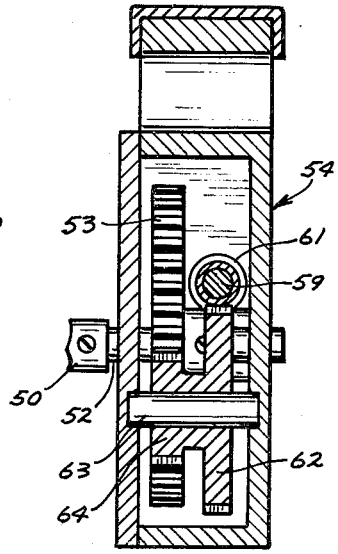
INVENTOR.
WILLIAM G. KUBICEK
BY
ATTORNEYS 3,050,050
ALTERNATING PRESSURE SEAT
William G. Kubicek, Rosemount, Minn., assignor to Regents of The University of Minnesota, Minneapolis, Minn., a corporation of Minnesota
Filed July 13, 1956, Ser. No. 597,764
6 Claims. (Cl. 128—33)

This invention relates to an alternating pressure seat for use by paraplegics and others and more particularly to a collapsible wheel chair fitted with an alternating pressure seat.

The invention is directed to a seat adapted for the relief of prolonged pressure on the buttocks and thighs of paraplegics and others suffering from similar injuries to the nervous system. Since such individuals have no feeling in these parts they are unaware of long continued pressure on any given point. As a result of prolonged pressure circulation is cut off and ulcerations may appear.

It is the principal object of this invention to provide an alternating pressure seat adapted to relieve prolonged pressure on any given point by continuously changing the pressure on the points of contact and intermittently alternating the points of support and contact.

Many paraplegics and others similarly injured are able to be completely rehabilitated and to assume positions of responsibility in business and industry as useful contributing members of society. They are limited only to jobs that may be carried out while seated. To facilitate movement it is customary for a rehabilitated paraplegic to have his own collapsible wheel chair which may be used at home, collapsed and readily carried to his place of employment, and then expanded and used at work. A serious limitation on the complete rehabilitation of the paraplegic is his inability to sit for long periods without constant change of position to prevent ulcerations resulting from limited circulation and his unawareness of the need for change due to the impairment of his nervous system.

It is a further object of this invention, therefore, to provide a foldable alternating pressure seat adapted for installation in a collapsible wheel chair.

Other objects of the invention will become apparent as the description proceeds.

To the accomplishment of the foregoing and related ends, this invention then comprises the features hereinafter fully described and particularly pointed out in the claims. The following description sets forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a front elevation of a collapsible wheel chair containing the alternating pressure seat of this invention;

FIGURE 2 is a front elevation of the same chair shown in collapsed condition;

FIGURES 5, 6 and 7 are fragmentary vertical side elevations taken generally along the line 5—5 of FIGURE 3 and in the directon of the arrows and showing respectively the movable portion of the seat in its uppermost, intermediate and lowermost positions;

FIGURE 8 is a vertical front elevation in section of the gear reduction box taken on the line 8—8 of FIGURE 3 and in the direction of the arrows;

FIGURE 9 is a vertical end elevation in section taken on the line 9—9 of FIGURE 8 and in the direction of the arrows.

Figure 3:
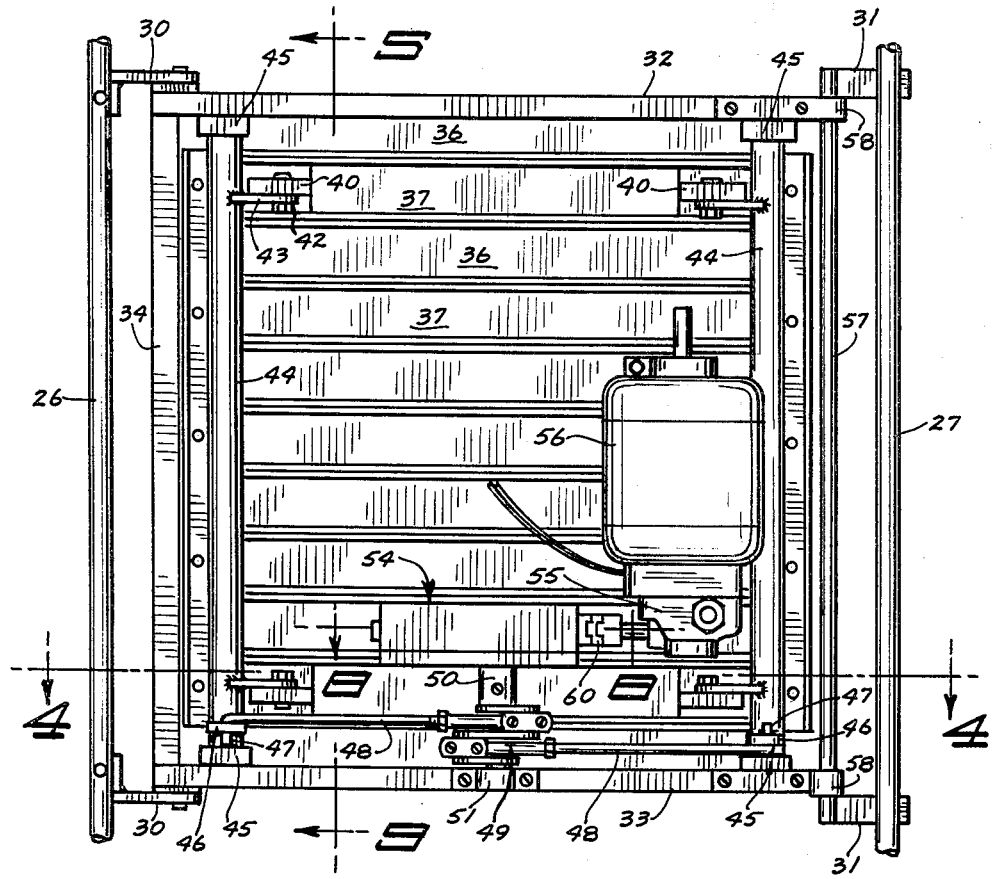
FIGURE 3 is a bottom plan view of the alternating pressure seat of this invention taken on the line 3—3 of FIGURE 1 and in the direction of the arrows.

Broadly stated, the objects of the invention are achieved by providing a seat composed of alternate stationary and movable slats. The movable slats are adapted to move in a slow rhythmic cycle from a position substantially above the surface of the stationary slats to a position substantially below the surface of the stationary slats. Thus, in the course of one cycle the portion of the body of the user of the seat in contact with the seat is supported in turn entirely by the movable slats, equally by the movable and stationary slats and entirely by the stationary slats. In between the extremes of support there are an infinite number of intermediate stages of support. The patient in this way is subjected to constantly changing pressure at the points of contact obviating any impairment in circulation due to prolonged pressure.

Referring to the drawings, in FIGURES 1 and 2 there is shown the alternating pressure seat of this invention, indicated generally at 10, installed in a conventional folding or collapsible type wheel chair, indicated generally at 11. As is usual, the wheel chair is generally symmetrical and comprises a pair of vertical back frame members 12 curved backward at their upper ends to form handles, vertical front frame members 13, horizontal side frame members (not shown) connecting the front and back, and side handles 15 likewise connecting the front and back members. All of the frame members are customarily tubular steel. A wheel 16 is journalled into the frame on each side and a hand wheel 17 is provided to turn the wheels 16. The frame likewise carries a pair of small wheels 18 and a pair of folding foot rests 19. A flexible back rest 20 stretches between the back frame members 12.

The opposite side frame members are joined together by a set of front and back folding braces. Only the front braces are visible in the drawings but the construction of the rear braces will be understood to be generally similar. The brace members 21 and 22 are pivotally mounted at 23 and 24 respectively to the front frame members 13. At their cross-over point 25 the braces are pivotally joined to permit a scissors-like action when the chair is collapsed. At their opposite or free ends the braces 21 and 22 carry horizontal bars or rods 26 and 27 respectively, the opposite ends of the bars or rods being carried by the corresponding rear braces. In the ordinary collapsible wheel chair horizontal rods 26 and 27 carry a flexible collapsible seat suspended between the rods. That flexible seat is replaced by the alternating pressure seat 10 of this invention, also supported on rods 26 and 27.

The position of braces 21 and 22 while open is stabilized and the braces are further supported by auxiliary curved braces 28 and 29 pivotally secured both to the brace members and to the frame of the chair. As will be described in greater detail hereinafter the alternating pressure seat 10 is pivotally supported on one side in brackets 30 secured to horizontal rod 26 and is movably supported on the opposite side when the chair is in an open position by hooks 31 which fit over rod 27.

It is to be understood that the alternating pressure seat of this invention is not limited to use in a wheel chair, and when so used is not limited to use in a wheel chair of any particular construction. While wheel chairs are generally similar they do differ in structural details. The particular chair illustrated is merely exemplary of the type of wheel chair to which the alternating pressure seat of this invention is adapted.

Figure 4:
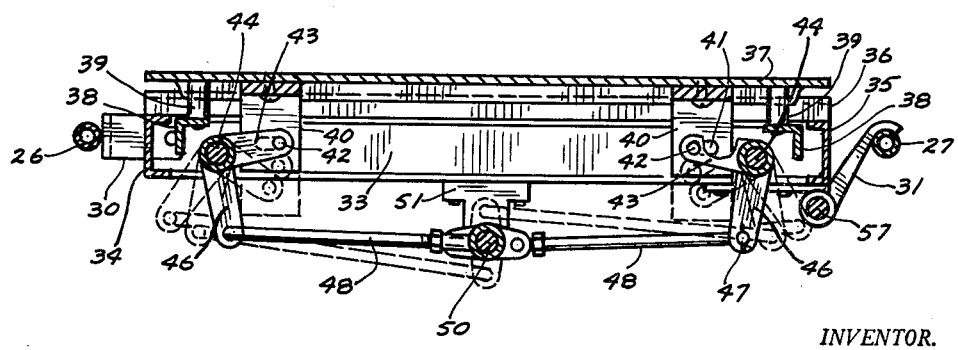
FIGURE 4 is a vertical front elevation in section taken on the line 4—4 of FIGURE 3 and in the direction of the arrows and showing the movable portion of the seat in its uppermost position.

Referring now particularly to FIGURES 3 and 4, the alternating pressure seat 10 is comprised of a generally rectangular base including a front channel member 32, a back channel member 33 and two side channel members 34 and 35. The channel members are all secured together to form a rigid frame for the seat. The top of the seat is comprised of a plurality of spaced apart stationary slats 36, rigidly secured to the top edges of side channel members 34 and 35 by bolting or other suitable fastening means. In the spaces between stationary slats 36 there are positioned a plurality of movable slats 37. Stationary slats 36 and movable slats 37 together form the body supporting surfaces for the user of the chair. (The slats shown are formed of metal channeling and are made individually and bolted to supports to form a unit. Alternatively, sets of stationary slats and the sets of movable slats may each be molded as one unit.) To enable movable slats 37 to be moved as a unit they are secured adjacent to their ends to a pair of transverse horizontal angle supports 38. The slats 37 are secured to supports 38 through spacers 39 of a height sufficient to permit a full cycle of movement of the movable slats 37 above the upper surfaces of stationary slats 36 without obstruction.

The plurality of movable slats 37 secured to angle supports 38 through the spacers 39 form a rigid generally rectangular unit which is moved up and down slowly to produce the alternating pressure on the body of the user of the chair. The movement is imparted to the unit through a plurality of depending lugs 40 extending downwardly from the under surface of the movable slats. As shown here, there is provided one pair of lugs 40 for each side of the movable seat unit. Each lug is aligned generally with the slats and is provided with a horizontal slot 41 (see FIGURE 4) for receiving a pin or bolt 42 of a crank arm 43.

Crank arms 43 are carried by a pair of parallel tilting shafts 44 each journalled in bearing blocks 45 secured to the front and rear channel members 32 and 33. Tilting movement is imparted to shafts 44 through crank arms 46 welded or otherwise secured to the shaft 44. When shaft 44 is viewed endwise crank arms 43 and 46 are disposed at about right angles to one another but spaced apart. The ends of crank arms 46 each receive a pin 47 carried at the outer end of a link 48. The opposite or inner ends of links 48 carry bearings 49 mounted on the crank pins of crank shaft 50 having two double cranks. One end of crank shaft 50 journalled in a bearing block 51 depending from channel member 33 and the opposite end of the crank shaft is connected to shaft 52 which carries spur gear 53 in gear reduction box 54 (see FIGURES 8 and 9). Crank shaft 50 is driven through gear reduction box 54 from the gear box 55 of reduced speed electric motor 56 which is mounted on the underside of the seat and is plugged into any appropriate source of electric current, all as explained in more detail hereinafter.

A horizontal shaft 57 is journalled in brackets 58 at opposite corners of one side of the seat frame. Hooks 31 used for supporting the seat 10 in a wheel chair from horizontal bar 27 are keyed to shaft 57 so that engagement or release of one of hooks 31 serves to engage or release the other hook at the same time.

Electric motor 56 as purchased is a standard unit equipped with a gear box 55 for accomplishing a reduction from the rated 1800 r.p.m. of the motor to 150 r.p.m. Since the preferred speed of operation of the seat of this invention is one cycle every three to six minutes it is necessary to provide further reduction through gear box 54 mounted below one of stationary slats 36.

The reduction gearing system includes a shaft 59 journalled in the end walls of the box 54 for rotation. Shaft 59 is connected through a suitable coupling 60 to the drive shaft of the motor reduction gear box 55. A worm 61 is keyed for rotation with shaft 59. The teeth of worm 61 mesh with the teeth of a spur gear 62. Rotation of shaft 59 and worm 61 causes rotation of spur gear 62 which is keyed to shaft 63 journalled in the sidewalls of the gear box for rotation. A somewhat smaller pinion 64 is keyed to shaft 63 for rotation with spur gear 62. The teeth of pinion 64 mesh with those of spur gear 53 to rotate shaft 52 and drive the crank shaft 50.

In the operation of the alternating pressure seat of this invention the electric motor 56 is connected to any suitable source of current. Motor 56 through reduction gear box 55 and coupling 60 drives shaft 59 and worm 61. The meshing of the teeth of worm 61 and spur gear 62 drive shaft 63 and pinion 64. Pinion 64 in turn drives spur gear 53 and shaft 52 which is coupled to crank shaft 50. Rotation of crank shaft 50 imparts a slow eccentric in and out motion to links 48. Links 48 are pivotally connected at 47 to crank arms 46 which are secured to shaft 44.

The slow in and out motion of links 48 against crank arms 46 imparts a slow tilting motion to shaft 44 as indicated by the broken lines in FIGURE 4. Because crank arms 43 and 46 are disposed on shaft 44 at about right angles to one another the back and forth tilting action of crank arm 46 and shaft 44 imparts an up and down motion to crank arms 43. This motion is conveyed by pins 42 sliding in slots 41 of depending lugs 40 to give an up and down motion to the lugs. Since lugs 40 are carried by the movable slats 37 and these slats are assembled as a rigid unit supported by angle supports 38, the slow up and down motion is imparted to the movable slats in unison.

The relative movement of the movable slats 37 with respect to the alternating stationary slats 36 is best shown in FIGURES 5 to 7. The movable slats move in a cycle in the course of about 3 to 6 minutes (depending upon the particular gear reduction) from a high point as shown in FIGURE 5 wherein the surfaces of slats 37 are elevated substantially above to the corresponding surfaces of stationary slats 36 to a low position as shown in FIGURE 7 where the reverse is true. When either the high or low points are reached the movement is reversed. At two times in the course of each cycle the surfaces of the movable and stationary slats are coplanar as shown in FIGURE 6.

It will be readily seen that during the course of each cycle the pressure upon the body of the user of the seat is being constantly changed but at an almost imperceptible rate. In turn in one half of a cycle the body is supported entirely by the movable slats, then gradually changing the weight is carried equally by both the movable and stationary slats and again gradually changing until the weight is carried entirely by the stationary slats. Then the whole sequence is reversed to complete one cycle.

It will be noted that the slats are of substantial thickness corresponding to about one half the distance the movable slats move during each cycle. This is to prevent any possibility of pinching of the seat user's flesh between the slats. The required effective thickness may be achieved by using solid slats, tubular slats, or as shown here, slats formed from channel material having side walls of the proper depth. Spacers 39 must necessarily be at least about as thick as the stationary slats.

When the seat is utilized in a folding wheel chair it is pivotally mounted on one side through brackets 30 to horizontal rod 26 which is carried by the ends of folding braces 22. The opposite side of the seat is temporarily and movably supported through hooks 31 by the opposite companion horizontal bar 27 carried by the ends of folding braces 21. When it is desired to collapse the wheel chair, hooks 31 are released and by virtue of the pivotal linkage at the opposite side the seat readily folds between the sides of the collapsed chair.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. In a collapsible wheel chair comprising front and back and vertical frame members, horizontal side members connecting said front and back vertical members, wheels journalled in said frame for rotation, a flexible back support between said back vertical frame members, diagonal folding braces extending between said front vertical frame members and between said back vertical frame members, said braces being pivotally mounted to the frame at their lowermost ends, pivotally attached to each other at their point of intersection and horizontal seat supporting rods carried by the upper ends of said diagonal braces, the improvement which consists in providing a foldable continuously alternating pressure seat comprising a rigid frame, a plurality of spaced apart stationary slats forming part of the body supporting surface of said seat securing to said frame, a plurality of movable slats disposed in the spaces between said stationary slats and likewise forming part of the body supporting surface of the seat, each of said movable slats being secured to a common supporting member whereby the movable slats are movable together as a unit, motor means secured to the bottom surface of said seat, a reduction gearing system for reducing the effective speed of said motor and means for translating the rotary motion of said motor means and gearing system into eccentric motion for moving said movable slats up and down with respect to said stationary slats, said translating means comprising a tilting shaft journaled in said seat frame transverse to the longitudinal direction of said slats for limited rotation, means on said shaft for engaging the undersurface of said movable slat unit and eccentric crank means for tilting said shaft, one side of said seat being pivotally supported by one of said horizontal seat supporting rods and hooks mounted on the frame on the opposite side of said seat for temporarily supporting that side of the seat from the opposite horizontal seat supporting bar.

2. A collapsible wheelchair according to claim 6, having an alternating pressure seat further characterized in that said means for engaging the movable slat unit comprises at least one crank arm on said tilting shaft, a pin on said crank arm, a lug depending from the undersurface of said movable slat unit and a slot in said lug to receive said crank pin.

3. A collapsible wheelchair according to claim 1 having an alternating pressure seat further characterized in that two parallel tilting shafts are provided journalled in said seat frame for limited rotation, a crank shaft disposed centrally between said parallel shafts, crank arms on said parallel shafts and link means connecting said crank arms with the cranks of said crank shaft.

4. A collapsible wheelchair according to claim 3 having an alternating pressure seat further characterized in that said movable and stationary slats have a substantial effective thickness corresponding to about one-half of the total distance the movable slats move in the course of an alternating pressure cycle.

5. In a collapsible wheel chair comprising front and back vertical frame members, horizontal side members connecting said front and back vertical members, wheels journalled in said frame for rotation, a flexible back support between said back vertical frame members, diagonal folding braces extending between said front vertical frame members and between said back vertical frame members, said braces being pivotally mounted to the frame at their lowermost ends, pivotally attached to each other at their point of intersection and horizontal seat supporting rods carried by the upper ends of said diagonal braces, the improvement which consists in providing a foldable continuously alternating pressure seat comprising a rigid frame, a plurality of spaced apart stationary slats forming part of the body supporting surface of said seat secured to said frame, a plurality of movable slats disposed in the spaces between said stationary slats and likewise forming part of the body supporting surface of the seat, each of said movable slats being secured to a common supporting member whereby the movable slats are movable together as a unit, a pair of parallel shafts journaled in said frame below said slats for limited rotation, said shafts being disposed transverse to the direction of said slats, a double-crank shaft disposed centrally between said parallel shafts, crank arms on said parallel shafts and link means connecting said crank arms with the cranks of said crank shaft to impart an eccentric tilting motion to said parallel shafts, motor means to drive said crank shaft and a gear reducing system to reduce the effective speed of said motor, and other crank arms on said parallel shaft spaced apart from and angularly disposed with respect to said first crank arms for imparting an up and down motion to said movable slat unit in response to the tilting motion of said shafts, one side of said seat being pivotally supported by one of said horizontal seat supporting rods and hooks mounted on the frame on the opposite side of said seat for temporarily supporting that side of the seat from the opposite horizontal seat supporting bar.

6. A collapsible wheelchair according to claim 5 having an alternating pressure seat further characterized in that said other crank arms on the parallel shafts are provided with pins adjacent their ends and the undersurface of said movable slat unit is provided with a plurality of depending lugs corresponding in number to said crank arms, each of said lugs having a slot to receive said crank pins.

References Cited in the file of this patent
UNITED STATES PATENTS

| 1,643,793 | Sparhawk | Sept. 27, 1927 |
| 2,448,777 | Crise | Sept. 7, 1948 |
| 2,649,309 | Deissner | Aug. 18, 1953 |
| 2,684,672 | Summerville | July 27, 1954 |

UNITED STATES PATENT OFFICE
CERTIFICATE OF CORRECTION

Patent No. 3,050,050                          August 21, 1962

William G. Kubicek

It is hereby certified that error appears in the above numbered patent requiring correction and that the said Letters Patent should read as corrected below.

Column 5, line 45, for the claim reference numeral "6" read -- 1 --.

Signed and sealed this 11th day of December 1962.

(SEAL)
Attest:

ERNEST W. SWIDER
Attesting Officer

DAVID L. LADD
Commissioner of Patents